(12) United States Patent
Zimmer (10) Patent No.: US 12,223,000 B2
(45) Date of Patent: *Feb. 11, 2025

(54) DATA SHAPING SYSTEM

(71) Applicant: Trent Zimmer, Youngsville, LA (US)

(72) Inventor: Trent Zimmer, Youngsville, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,041

(22) Filed: Jan. 2, 2024

(65) Prior Publication Data

US 2024/0134920 A1 Apr. 25, 2024

Related U.S. Application Data

(63) Continuation of application No. 16/708,511, filed on Dec. 10, 2019, now Pat. No. 11,914,659.

(60) Provisional application No. 62/777,358, filed on Dec. 10, 2018.

(51) Int. Cl.
| | |
|---|---|
| *G06F 16/9535* | (2019.01) |
| *G06F 9/451* | (2018.01) |
| *G06F 16/2457* | (2019.01) |
| *G06F 16/25* | (2019.01) |
| *G06F 16/9538* | (2019.01) |

(52) U.S. Cl.
CPC .......... *G06F 16/9535* (2019.01); *G06F 9/451* (2018.02); *G06F 16/24578* (2019.01); *G06F 16/258* (2019.01); *G06F 16/9538* (2019.01)

(58) Field of Classification Search
CPC .................................................. G06F 16/9535
See application file for complete search history.

(56) References Cited

U.S. PATENT DOCUMENTS

| | | |
|---|---|---|
| 2005/0076066 A1 | 4/2005 | Stakutis et al. |
| 2006/0069675 A1 | 3/2006 | Ogilvie |
| 2008/0021755 A1 | 1/2008 | Jones et al. |
| 2008/0104061 A1 | 5/2008 | Rezaei |
| 2013/0262365 A1 | 10/2013 | Dolbear et al. |
| 2014/0079297 A1 | 3/2014 | Tadayon et al. |
| 2016/0012464 A1 | 1/2016 | Bryant, III et al. |
| 2016/0103876 A1* | 4/2016 | Bakir et al. ....... G06F 17/30448 |
| 2016/0180248 A1 | 6/2016 | Regan |
| 2023/0195693 A1* | 6/2023 | Hasan et al. ............ G06F 16/17 |

* cited by examiner

*Primary Examiner* — James J Debrow
(74) *Attorney, Agent, or Firm* — Asgaard Patent Services, LLC; F. Wayne Thompson, Jr.

(57) ABSTRACT

The data shaping system comprises a computer implemented algorithm that uses modifiers (e.g., time available to study, educational attainment of the user, etc.) to shape data retrieved from one or more datasets for consumption by a user. A dataset may comprise text, images, video, audio, or a combination thereof. The data shaping system is configured to curate data, retrieved from selected datasets, using modifiers to shape (or assemble) an output document that is presented to the user for review. In this way, the user is provided with a curated subset of data, which is an assemblage of information about two or more topics of interest and how the two or more topics of interest are related, that has been tailored to their needs. In some implementations, the output document may be text, one or more images, audio, video, or a combination thereof.

16 Claims, 4 Drawing Sheets

DATA SHAPING SYSTEM

CROSS REFERENCE TO RELATED APPLICATION

This application is a continuation of U.S. patent application Ser. No. 16/708,511, filed on Dec. 10, 2019, which claims the benefit of U.S. Provisional Application Ser. No. 62/777,358, filed on Dec. 10, 2018, the entireties of both applications are incorporated herein by reference.

TECHNICAL FIELD

This disclosure relates to implementations of a computer implemented data shaping system. In particular, the present invention is primarily directed to a computer program configured to search for, retrieve, and curate data relevant to two or more topics of interest to a user, and to present the user with an output document comprising the curated data.

BACKGROUND

The World Wide Web contains a vast collection of information about every, or virtually every, imaginable subject. The World Wide Web can be accessed through the Internet, and used to search for and share information. Most users access the World Wide Web, via the Internet, using a web browser and a search engine. Unfortunately, searching the World Wide Web using a conventional search engine is extremely inefficient due to the sheer volume of information available. Specifically, due to the abundance of available information, inefficiency results from time spent reviewing information/sources already known to a user, validating the credibility of unknown sources, and reviewing irrelevant sources presented by the search engine. As a result, users are separated from information that drives inspiration, creativity, and epiphanies by the cacophony of irrelevant, or at the very least unhelpful, search results.

Accordingly, it can be seen that needs exist for the data shaping system disclosed herein. It is to the provision of a data shaping system that is configured to address these needs, and others, that the present invention in primarily directed.

SUMMARY OF THE INVENTION

Implementations of a data shaping system are provided. The data shaping system comprises a computer implemented algorithm that uses modifiers (e.g., time available to study, educational attainment of the user, etc.) to shape data, retrieved from one or more datasets, for consumption by a user. A dataset may comprise text, images, video, audio, or a combination thereof. The data shaping system is configured to curate data, retrieved from selected datasets, using modifiers to shape (or assemble) an output document that is presented to the user for review. In this way, the user is provided with a curated subset of data, which is an assemblage of information about two or more topics of interest and how the two or more topics of interest are related, that has been tailored to their needs. In some implementations, the output document may be text, one or more images, audio, video, or a combination thereof.

An exemplary implementation of a data shaping system comprises: a memory storing a computer program, a network interface configured to communicate with client devices across a computer network, and a processor configured to execute the computer program. The computer program utilizes a graphical user interface, displayed by a client device, in which a user can enter one or more search terms related to two or more topics of interest. The computer program, using the one or more search terms, is configured to search one or more datasets, connected to the computer network, for data relevant to the two or more topics of interest. The computer program is configured to retrieve data relevant to the two or more topics of interest from the one or more datasets. The computer program, using one or more modifiers, is configured to curate data relevant to the two or more topics of interest retrieved from the one or more datasets. The one or more modifiers are used to alter how the computer program prioritizes and sorts data being curated. The computer program, using curated data relevant to the two or more topics of interest, is configured to generate a curated subset of data. The curated subset of data is an assemblage of information, about the two or more topics of interest and how the two or more topics of interest are related, compiled by the computer program using the one or more modifiers to refine the information included therein. The computer program is configured to generate an output document using the curated subset of data and to present the output document to the user.

BRIEF DESCRIPTION OF THE DRAWINGS

Like reference numerals refer to corresponding parts throughout the several views of the drawings.

DETAILED DESCRIPTION

The data shaping system comprises a computer implemented algorithm that uses modifiers (e.g., time available to study, educational attainment of the user, etc.) to shape data, retrieved from one or more datasets, for consumption by a user. A dataset may comprise text, images, video, audio, or a combination thereof. The data shaping system is configured to curate data, retrieved from selected datasets, using modifiers to shape (or assemble) an output document that is presented to the user for review. In this way, the user is provided with a curated subset of data, relevant to one or more topics of interest to the user (e.g., cellular biology), that has been tailored to their needs.

Figure 1:
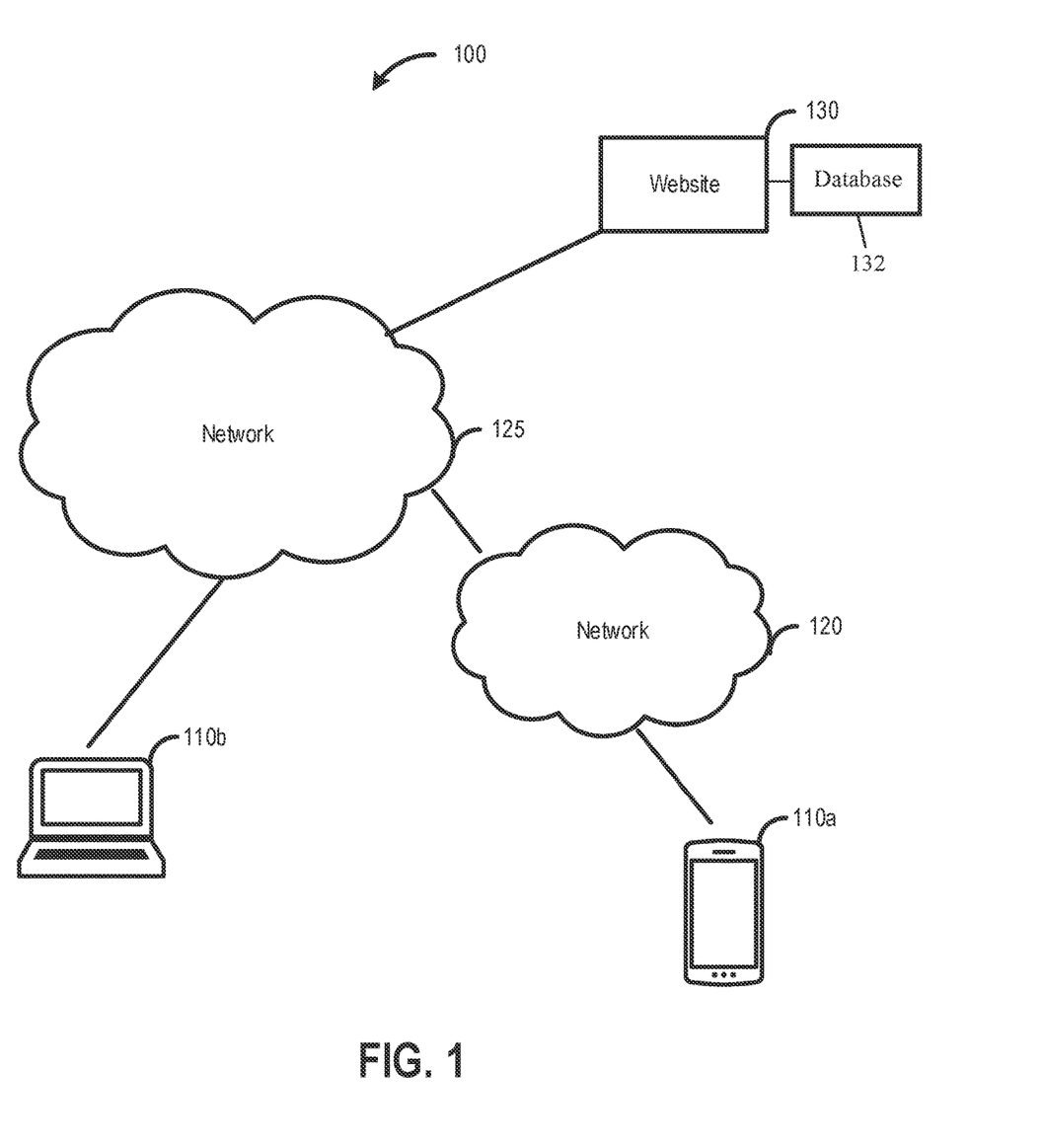
FIG. 1 illustrates an example environment for the data shaping system according to the principles of the present disclosure.

FIG. 1 illustrates an example environment 100 in which the data shaping system of the present disclosure can operate. In some implementations, the environment 100 can include client devices 110*a* and 110*b* (collectively client device 110), a wireless cellular network 120, a network 125, and a website 130. Client devices 110*a* and 110*b* are depicted as a mobile phone 110*a* and desktop computer 110*b*, respectively, but client devices 110 may comprise any type of computing device, such as a desktop computer system, a laptop computer, a smartphone, a mobile telephone, a tablet-style computer, or any other portable electronic device (e.g., a handheld electronic device or a wearable electronic device).

In some implementations, the network 125 may be an intranet, an extranet, a virtual private network (VPN), a local area network (LAN), a wireless LAN (WLAN), a wide area network (WAN), a metropolitan area network (MAN), a portion of the Internet, or another network 125 or a combination of two or more such networks 125. The present disclosure contemplates any suitable network 125.

In some implementations, the client device 110*a* can connect to the network 125 through a wireless cellular network 120, such as GPRS-based and CDMA-based wireless networks, as well as 802.16 WiMax and long-range wireless data networks.

Client devices 110*a* and 110*b* can interact with the website 130 via an application, such as a web browser or a native application, residing on the client devices 110*a* and 110*b*.

In some implementations, the data shaping system may be an application (or a plugin for another application) stored on a client device 110. The data shaping system can generate a graphical user interface (GUI), that is displayed by a client device 110, in which a user can enter one or more search terms for a topic, or topics, of interest. In some implementations, once the user has input search terms, the data shaping system is configured to search for and retrieve data (e.g., text, images, video, audio, or a combination thereof) from one or more sources (e.g., one or more websites 130) connected to the network 125, and curate the selected dataset(s) using one or more modifiers. In this way, a curated subset of data relevant to the user's topic(s) of interest can be generated. In some implementations, the data shaping system may be configured to generate one or more output documents using computer rendered templates and the curated subset of data compiled by the data shaping system.

Figure 2:
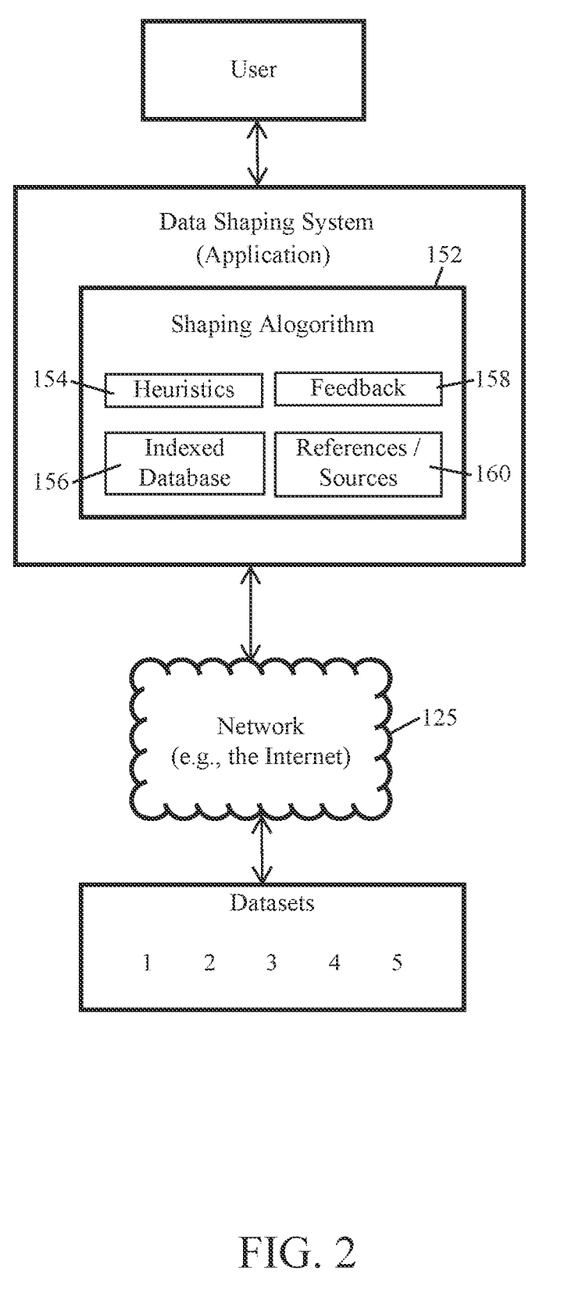
FIG. 2 illustrates an example data shaping system according to the principles of the present disclosure, wherein the data shaping system is shown having access to a network that is connected to at least five datasets.

In some implementations, the data shaping system may be configured so that each user can create an account. The data shaping system may associate each user account with personal information (e.g., name of the user), modifiers used to shape data by the data shaping system, other user related information (e.g., results of a reading test), or a combination thereof. In this way, the shaping algorithm 152 may be refined for a specific user. In some implementations, the data shaping system may generate a graphical user interface (GUI), that is displayed by a client device 110, wherein a user can enter account login information and thereby gain access to, and modify as necessary, their account profile.

In some implementations, a curated subset of data is generated from one or more datasets selected by the user, known to the data shaping system, or found by the data shaping system via a search of the network 125 that are curated based on one or more modifiers. The curated subset of data may be stored by the data shaping application on a client device 110. In some implementations, a dataset may be a website 130, a database 132 connected to a website 130, or a combination thereof.

In some implementations, the modifiers alter (or refine) how the shaping algorithm 152 of the data shaping system prioritizes and sorts data (i.e., curates). In some implementations, the data shaping system generates a graphical user interface (GUI), that is displayed by a client device 110, wherein the user can set, or change, one or more modifiers. These user set modifiers (or preferences) may include, but are not limited to, the amount of time a user has to review the output document, educational attainment of the user, reading level of the user, subject matter competence, user interest, subject matter literacy, or a combination thereof.

In some implementations, the data shaping system is configured to test the reading speed of a user and to use this information when curating one or more datasets for inclusion in an output document. In this way, for example, if the amount of time a user has to review the output document is a selected modifier influencing the shaping algorithm 152, the user may be provided with an output document (e.g., a text document) of appropriate length.

As shown in FIG. 2, in some implementations, the data shaping system may use other modifiers to curate (or shape) one or more selected datasets. Example modifiers used by the data shaping system may include, but are not limited to:

Heuristics 154 that aid the data shaping system with identifying relevant datasets based on similarities to the user selected topic(s) of interest; aggregating the identified datasets based on other modifiers.

An indexed database 156 of information comprising data collected from one or more datasets by the data shaping system during a search (e.g., a current search, a previous search, or a combination thereof).

Feedback 158 generated by user reviews of the output document(s) prepared by the data shaping system. Feedback 158 could be stored by the data shaping system and used to refine how future datasets are curated (or shaped) for inclusion in an output document prepared by the data shaping system for a user. In some implementations, the data shaping system may generate feedback 158 by tasking a user with identifying key words, phrases, concepts, video segments, audio segments, or a combination thereof, that can be used by the shaping algorithm 152 to refine future output documents generated thereby.

References/Sources 160 found during a search that could be pulled to augment the output document provided to the user. In some implementations, the credibility of one or more references/sources 160 could be assessed and weighted based on the presence of citations and their number, the origin of the dataset (e.g., a university website (.edu), a government website (.gov), etc.), or a combination thereof.

In some implementations, while a selected dataset is being curated (or shaped), the data shaping system may be configured to alter data-types (e.g., transcribe audio to text). As a nonlimiting example, in some implementations, a selected dataset (e.g., a 1-hour video) may be curated (or shaped) by the data shaping system for consumption by a user having limited time (e.g., 10 minutes). Then, the user may be given the option to convert (or transcribe) the video to text for faster consumption, since most users can review a transcript faster than a video presenting the same information. As another nonlimiting example, in some implementations, the data shaping system may be configured to convert tabular data into an infographic (e.g., a chart). In this way, the user is able to select how data is presented in the output document provided by the data shaping system.

The output document comprises a curated subset of data about one or more user selected topic(s) that is the product of the data shaping system. The output document may be stored by the data shaping application on a client device 110. In some implementations, the curated subset of data, and the output document generated therefrom, is an assemblage of information compiled by the data shaping system using the modifiers (e.g., educational attainment of, and time available to, the user) to select (or prioritize) the information included therein. In this way, for example, the data shaping system can provide the user with an output document that includes information relevant to the educational attainment of, and the time available to, the user. Thus, the data shaping system allows the user to more efficiently consume data relevant to the selected topic(s). In some implementations, the output document may include citations (e.g., parenthetical citations), hyperlink(s) to related data sources, highlighted text, or a combination thereof.

In some implementations, the data shaping system may be configured to identify a claim asserted by the author of a selected dataset and search for additional references (or datasets) that support the claim, refute the claim, or a combination thereof. The result(s) of this supplemental search may be presented as part of the output document provided to the user. In some implementations, the reference (s) presented to the user by the data shaping system may be limited to those that support a consensus found amongst the searched sources, even if the consensus is contrary to the author's claim. In this way, the user can be made aware of claims that deviate from a consensus.

In some implementations, the data shaping system may be configured to weight the evidence supporting a claim (e.g., a scientific claim) set forth in a selected dataset (e.g., a scientific white paper). In this way, the data shaping system is provided with another way to curate (or shape) a dataset. In some implementations, by assessing other indexed datasets, the data shaping system may be able to weight the validity of an asserted claim. In some implementations, an asserted claim (e.g., a scientific claim) of a selected dataset that is curated for use as part of the output document may be highlighted if it is correct. In some implementations, highlighting a portion, or portions, of the output document may include, but is not limited to, adding additional text related to the validity of the claim to the output document, changing the color of the text, including an icon indicating the validity of the claim, or a combination thereof. Any additional text included as part of the output document may be pulled from an indexed dataset that was used to weight the validity of the asserted claim.

In some implementations, the data shaping system may be configured to include links to information that is relevant, or at least related, to the topic(s) presented in the output document. In this way, the user may be provided with additional insight about their topic(s) of interest. In some implementations, any included links may be tied to the evidence weighting function of the data shaping system that was discussed above.

In some implementations, the data shaping system may be configured to augment (or change) a previously presented output document with additional information (or data) in the event of a user set modifier changing (e.g., the amount of time a user has to review the output document increases). As a nonlimiting example, in some implementations, the data shaping system may be configured to re-curate (or re-shape) the one or more datasets originally curated and to provide an updated output document for consumption by a user. In this way, the user may be provided with a re-curated subset of data, in the form of an updated output document, that has been re-tailored to their changing needs. As another nonlimiting example, in some implementations, the data shaping system may search for one or more new datasets relevant to the user's topic of interest in response to a user set modifier changing, curate the new dataset(s), and generate an updated output document that includes the curated subset of data generated from the original dataset(s) and/or the new dataset(s). In this way, the user is provided with an updated output document that includes additional data about their topic(s) of interest.

Figure 3:
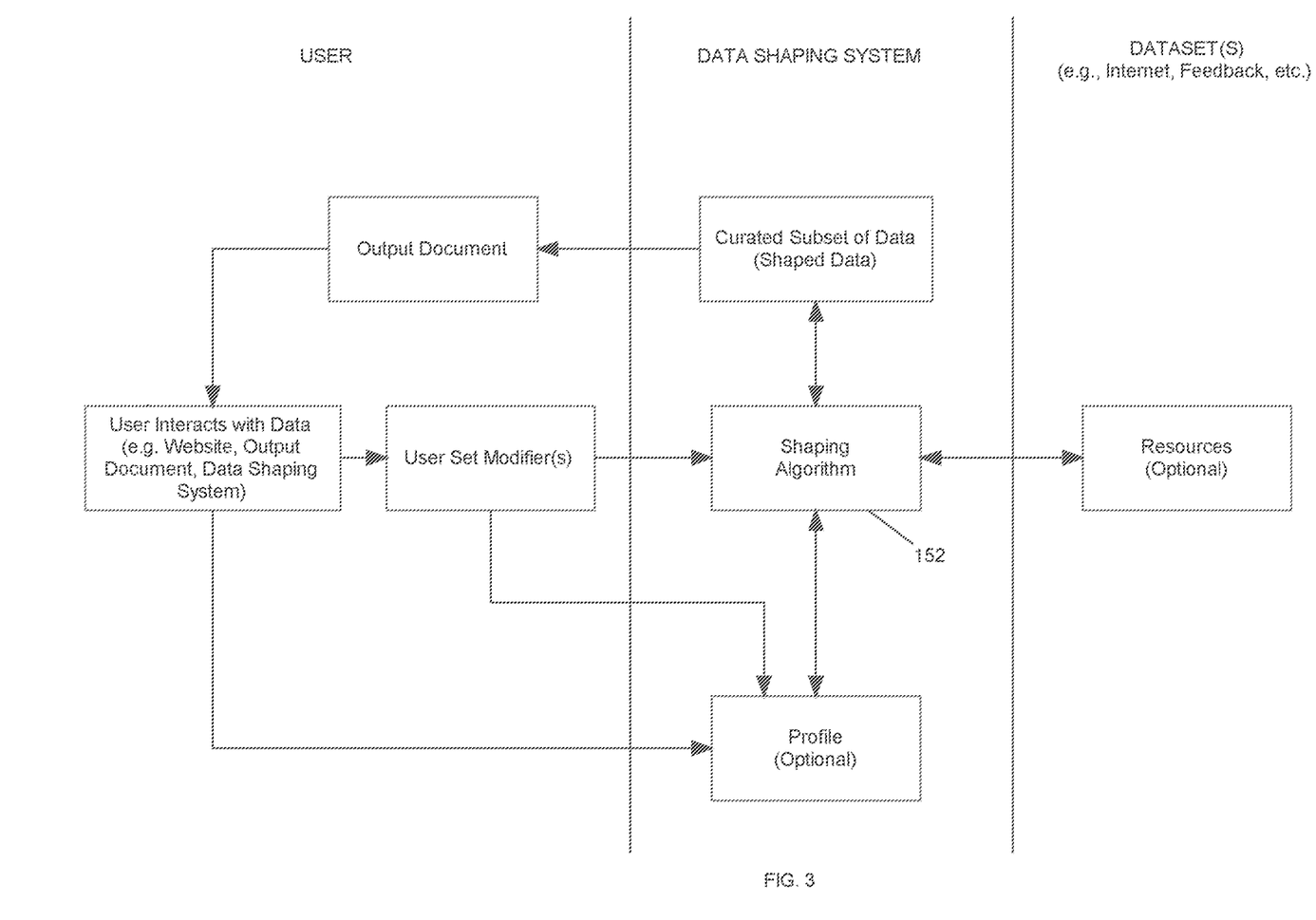
FIG. 3 illustrates a flowchart for an example implementation of the data shaping system according to the principles of the present disclosure.

In some implementations, one or more user set modifiers may change in response to an e-mail and/or text message received by an application stored on a client device 110. As a nonlimiting example, in some implementations, the data shaping system may be configured to retrieve (or receive) data from an e-mail (or text message) that has been received by the client device 110 on which the data shaping system is installed. The retrieved (or received) information may change one or more user set modifiers (e.g., the amount of time a user has to review the output document), thereby causing the shaping algorithm 152 to re-curate the one or more datasets originally curated and to provide an updated output document for consumption by a user (see, e.g., FIG. 3).

In some implementations, during a search for one or more datasets relevant to the user's topic(s) of interest, the data shaping system may be configured to index (or select) internet sourced datasets based on their popularity (e.g., the number of visitors a particular website receives, the number of books sold, etc.), the projected popularity thereof, or a combination thereof.

In some implementations, the data shaping system may be configured to proactively index internet sourced datasets based on popularity and to create pre-shaped datasets that can be refined in real-time. The user set modifiers may be used by the shaping algorithm 152 to refine these pre-shaped datasets for a specific user. In this way, the user is provided with a curated subset of data that has been tailored to their needs. In some implementations, the data shaping system may be configured to index internet sourced datasets based on popularity and to create a curated (or shaped) dataset in real-time. A datasets form (e.g., video, audio, etc.) may influence whether the data shaping system proactively indexes a dataset or does so in real-time. For example, video and audio datasets may require proactive indexing so that the shaping algorithm 152 of the data shaping system can efficiently transcribe the video (or audio) to text and/or collect other metadata (e.g., silence) for later use (e.g., analysis).

In some implementations, the data shaping system may be configured so that a user can highlight, or link to, one or more portions of a curated (or shaped) subset of data generated thereby. This feedback 158 could be recorded (or stored) by the data shaping system for future use by the shaping algorithm 152.

In some implementations, the data shaping system may be configured to work in conjunction with an sensor, such as an eye tracker, to determine how much time a user spends reviewing one or more portions of the output document. The data collected by the eye tracker may be used by the shaping algorithm 152 of the data shaping system to weight one or more portions of the curated subset of data being consumed by the user.

In some implementations, the data shaping system may be configured to work in conjunction with other sensor types that are configured to detect physiological (e.g., heart rate, etc.) changes in the user. The data collected by these sensors could be used to weight one or more portions of the curated subset of data being consumed by the user.

In some implementations, collected sensor data (e.g., eye movement, heart rate, etc.) could be stored as feedback and used by the shaping algorithm 152 to refine how selected datasets are curated (or shaped) thereby.

In some implementations, data previously excluded from the curated subset of data compiled by the data shaping system (i.e., the output document) may be added thereto if the user set modifiers are changed (e.g., the amount of time a user has to review the output document increases). In some implementations, this previously excluded data may be added as one or more separate sections to an updated output document. In this way, the user may avoid spending time re-consuming data. In some implementations, data previously excluded by the data shaping system may be integrated into a previously curated subset of data, but the previously excluded data may be highlighted to differentiate it from data that was part of the original curated dataset. In this way, for example, the user may be made aware of how much a particular dataset was condensed and/or what was added.

In some implementations, the data shaping system may be configured to work with a new class of HTML tags. These HTML tags may be configured to assist the data shaping system with prioritizing datasets during a search for data relevant to the user's topic(s) of interest (i.e., an HTML tag may act as a filter for the shaping algorithm).

In some implementations, the data shaping system is configured to curate text files, one or more images files, video files, audio files, or a combination thereof. In some implementations, the data shaping system may be configured to curate another form of data, developed in the future, that would be known to one of ordinary skill in the art.

In some implementations, the output document may be presented as text, one or more images, video, audio, or a combination thereof. The output document is presented to the user via a display of a client device 110. In addition to, or in the alternative, the output document may be presented to the user in some other corresponding multimedia manner, for example, as an audio clip played by the speaker(s) of the client device 110.

In some implementations, the data shaping system may be configured to store one or more curated subsets of data (or output document(s)) on a client device 110, and to allow a user to access a previously curated subset of data (or output document). In this way, if a user wants to review a previously provided subset of data for any reason, a user may backtrack to a previously curated subset of data.

In some implementations, the data shaping system may include a verification component for content and/or content creators. In this way, the data shaping system may be able to select datasets which include current and/or accurate information. In some implementations, the verification component of the data shaping system may be configured to verify the identify and/or credentials of a content creator. In some implementations, the verification component of the data shaping system may be configured to allow users and/or content creators to provide feedback on one or more datasets (e.g., a ranking system).

In some implementations, the data shaping system can use crowd sourced information (e.g., feedback) to optimize the operation of the shaping algorithm. In some implementations, crowd sourced information may be used by the data shaping system to change (or set) one or more modifiers. In this way, output documents provided by the data shaping system may be refined as a result of the crowd sourced information.

Figure 4:
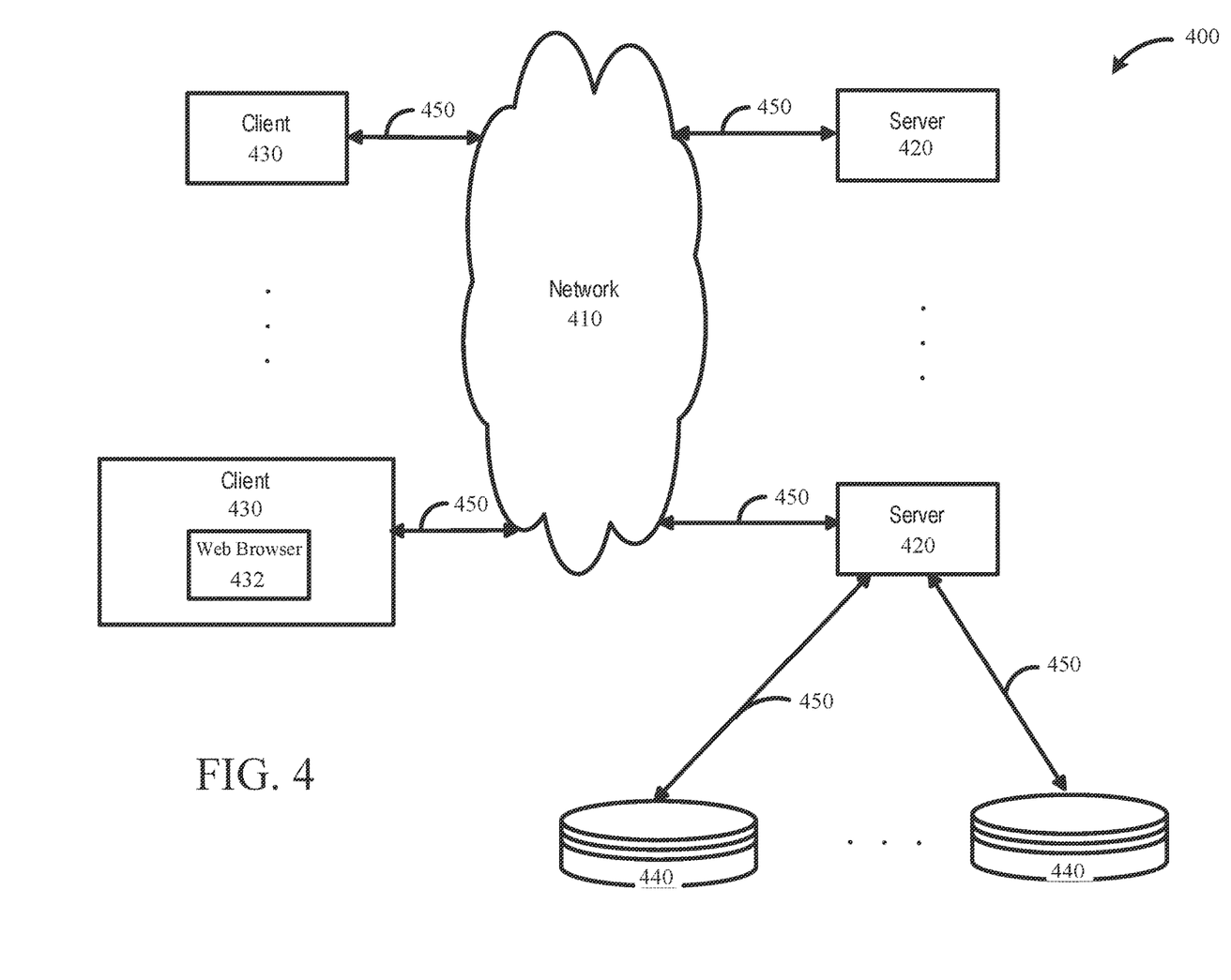
FIG. 4 illustrates another example environment for the data shaping system according to the principles of the present disclosure.

FIG. 4 illustrates another example environment 400 in which the data shaping system of the present disclosure can operate. The example environment 400 can include a network 410, one or more servers 420, and one or more clients 430. The example environment 400 can also include one or more data storage 440 linked to one or more servers 420. Particular embodiments may be implemented in the network environment 400. For example, application software used to perform the functions described above in connection with the data shaping system may be hosted by one or more servers 420.

In some implementations, the network 410 may be an intranet, an extranet, a virtual private network (VPN), a local area network (LAN), a wireless LAN (WLAN), a wide area network (WAN), a metropolitan area network (MAN), a portion of the Internet, or another network 410 or a combination of two or more such networks 410. The present disclosure contemplates any suitable network 410.

One or more links 450 couple a server 420 or a client 430 to the network 410. In some implementations, one or more links 450 each can include one or more wired, wireless, or optical links 450. In some implementations, one or more links 450 each can include an intranet, an extranet, a VPN, a LAN, a WLAN, a WAN, a MAN, a portion of the Internet, or another link 450 or a combination of two or more such links 450. The present disclosure contemplates any suitable links 450 coupling servers 420 and clients 430 to network 410.

In some implementations, each server 420 may be a unitary server or may be a distributed server spanning multiple computers or multiple datacenters. Servers 420 may be of various types, such as, for example and without limitation, web server, file server, application server, exchange server, database server, or proxy server. In some implementations, each server 420 may include hardware, software, or embedded logic components or a combination of two or more such components for carrying out the appropriate functionalities implemented or supported by server 420. For example, a web server is generally capable of hosting websites containing web pages or particular elements of web pages. More specifically, a web server may host HTML files or other file types, or may dynamically create or constitute files upon a request, and communicate them to clients 430 in response to HTTP or other requests from clients 430. A database server is generally capable of providing an interface for managing data stored in one or more data stores.

In some implementations, one or more data storages 440 may be communicatively linked to one or more servers 420 via one or more links 450. In some implementations, data storages 440 may be used to store various types of information. In some implementations, the information stored in data storages 440 may be organized according to specific data structures. In a particular embodiment, each data storage 440 may be a relational database. Particular embodiments may provide interfaces that enable servers 420 or clients 430 to manage, e.g., retrieve, modify, add, or delete, the information stored in data storage 440.

In some implementations, each client 430 may be an electronic device including hardware, software, or embedded logic components or a combination of two or more such components and capable of carrying out the appropriate functions implemented or supported by client 430. For example, and without limitation, a client 430 may be any type of computing device such as a desktop computer system, a laptop computer, a smartphone, a mobile telephone, a tablet-style computer, or any other portable electronic device (e.g., a handheld electronic device or a wearable electronic device). The present disclosure contemplates any suitable clients 430. A client 430 may enable a network user at client 430 to access the network 410. A client 430 may enable its user to communicate with other users at other clients 430.

A client 430 may have a web browser 432, such as Microsoft Internet Explorer, Google Chrome, Mozilla Firefox, Apple Safari, or any other future developed web browser and may have one or more add-ons, plug-ins, or other extensions. A user at client 430 may enter a Uniform Resource Locator (URL) or other address directing the web browser 432 to a server 420, and the web browser 432 may generate a Hyper Text Transfer Protocol (HTTP) request and communicate the HTTP request to the server 420. The server 420 may accept the HTTP request and communicate to client 430 one or more Hyper Text Markup Language (HTML) files responsive to the HTTP request. Client 430 may render a web page based on the HTML files from server 420 for presentation to the user. The present disclosure contemplates any suitable web page files. As an example, and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JavaScript, Java, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

In some implementations, a client 430 having a web browser 432 can connect to a server 420 to use the data shaping system described above. In some implementations, the data shaping system may be stored in a data storage 440 communicatively linked to the servers 420. In some implementations, information entered by, or collected from, a user interacting with the data shaping system may be stored in a data storage 440 communicatively linked to the servers 420, on a client 430, or a combination thereof. In some implementations, one or more datasets, curated subsets of data, output documents, and any other files generated by, or in connection with the operation of, the data shaping system may be stored in a data storage 440 communicatively linked to the servers 420, on a client 430, or a combination thereof. In some implementations, the data storage 440 may be a database.

In some implementations the method or methods described above in connection with the data shaping system may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, solid-state drives, and CD/DVD/Blu-ray devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that a certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user on one or more computing devices via a computer program product such as via an application programming interface (API).

While the data shaping system is primarily described as producing output documents for educational purposes, it should be understood that, the data shaping system can be used to produce output documents for entertainment purposes as well.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A data shaping system comprising:
a memory storing a computer program;
a network interface configured to communicate with client devices across a computer network; and
a processor configured to execute the computer program;
wherein the computer program utilizes a graphical user interface, displayed by a client device, in which a user can enter one or more search terms related to two or more topics of interest;
wherein the computer program, using the one or more search terms, is configured to search one or more datasets, connected to the computer network, for data relevant to the two or more topics of interest;
wherein the computer program is configured to retrieve data relevant to the two or more topics of interest from the one or more datasets;

wherein the computer program, using one or more modifiers, is configured to curate data relevant to the two or more topics of interest retrieved from the one or more datasets, the one or more modifiers are used to alter how the computer program prioritizes and sorts data being curated;

wherein the computer program, using curated data relevant to the two or more topics of interest, is configured to generate a curated subset of data;

wherein the curated subset of data is an assemblage of information, about the two or more topics of interest and how the two or more topics of interest are related, compiled by the computer program using the one or more modifiers to refine the information included therein;

wherein the computer program is configured to generate an output document using the curated subset of data; and wherein the computer program is configured to present the output document to the user.

2. The data shaping system of claim 1, wherein each of the one or more datasets is a website, a database connected to a website, or a combination thereof.

3. The data shaping system of claim 1, wherein the computer program is configured so that the user can create a user account, the user account is associated with the one or more modifiers used to curate data relevant to the two or more topics of interest retrieved from the one or more datasets.

4. The data shaping system of claim 3, wherein the computer program generates a graphical user interface, displayed by the client device, in which the user can select the one or more modifiers used to curate data.

5. The data shaping system of claim 4, wherein each of the one or more datasets is a website, a database connected to a website, or a combination thereof.

6. The data shaping system of claim 4, wherein the one or more modifiers used by the computer program to curate data are selected from a group comprising: heuristics that aid with identifying datasets relevant to the topic of interest, an indexed database of information comprising data collected from one or more datasets by the computer program, feedback used to refine how data retrieved from one or more datasets is curated for inclusion in the output document, and sources found during the search that can be included as part of the output document.

7. The data shaping system of claim 3, wherein the computer program is configured to test the reading speed of the user and to associate a result of the reading test with the user account, the result of the reading test is used by the computer program to curate data relevant to the two or more topics of interest and thereby generate an output document that the user should be able to read within an elected time period.

8. The data shaping system of claim 1, wherein the data, relevant to the two or more topics of interest, retrieved by the computer program can be text, one or more images, video, audio, or a combination thereof.

9. The data shaping system of claim 8, wherein the computer program, while generating the curated subset of data, is configured to convert audio to text for inclusion in the curated subset of data.

10. The data shaping system of claim 8, wherein the computer program, while generating the curated subset of data, is configured to convert tabular data into an infographic for inclusion in the curated subset of data.

11. The data shaping system of claim 1, wherein the output document generated by the computer program is a multimedia presentation.

12. The data shaping system of claim 1, wherein the computer program, in response to at least one of the one or more modifiers changing after the curated subset of data has been used to generate the output document, is configured to re-curate data, relevant to the two or more topics of interest, retrieved from the one or more datasets, and to generate a new curated subset of data used to augment the output document generated by the computer program.

13. The data shaping system of claim 1, wherein the computer program is configured to work in conjunction with one or more sensors configured to detect physiological changes in the user, data collected by the one or more sensors can be used by the computer program to refine how data, relevant to the two or more topics of interest, is curated.

14. The data shaping system of claim 1, wherein the computer program is configured to add data, that was previously excluded during curation, to the curated subset of data in response to at least one of the one or more modifiers changing; the computer program, in response to new data being added to the curated subset of data, is configured to generate a new output document using the curated subset of data; and the computer program is configured to present the new output document to the user.

15. The data shaping system of claim 14, wherein the computer program is configured to highlight text data added to the new output document.

16. The data shaping system of claim 1, wherein the memory storing the computer program and the processor configured to execute the computer program are embodied within at least one of a smart phone, a tablet-style computer, a personal computer, a laptop computer.

* * * * *